(12) United States Patent
Wing et al.

(10) Patent No.: US 8,484,331 B2
(45) Date of Patent: Jul. 9, 2013

(54) REAL TIME PROTOCOL PACKET TUNNELING

(75) Inventors: Daniel G. Wing, San Jose, CA (US); Michael A. Ramalho, Sarasota, FL (US)

(73) Assignee: Cisco Technology, Inc., San Jose, CA (US)

(*) Notice: Subject to any disclaimer, the term of this patent is extended or adjusted under 35 U.S.C. 154(b) by 288 days.

(21) Appl. No.: 12/916,716

(22) Filed: Nov. 1, 2010

(65) Prior Publication Data

US 2012/0110152 A1  May 3, 2012

(51) Int. Cl.
*G06F 15/173* (2006.01)
(52) U.S. Cl.
USPC ........... 709/223; 709/224; 709/230; 370/241; 370/248; 370/252
(58) Field of Classification Search
USPC ............... 709/230, 235, 237, 203, 217, 219, 709/223, 224; 370/352–356, 401, 435, 468, 370/471, 241, 248, 252
See application file for complete search history.

(56) References Cited

U.S. PATENT DOCUMENTS

| | | | | |
|---|---|---|---|---|
| 7,013,342 B2* | 3/2006 | Riddle | | 709/230 |
| 7,043,564 B1* | 5/2006 | Cook et al. | | 709/246 |
| 7,639,613 B1* | 12/2009 | Ghannadian et al. | | 370/232 |
| 7,693,164 B1* | 4/2010 | Busch et al. | | 370/401 |
| 7,706,278 B2* | 4/2010 | Wing et al. | | 370/236 |
| 7,710,867 B1* | 5/2010 | Masters | | 370/229 |
| 7,738,383 B2* | 6/2010 | Wing et al. | | 370/236 |
| 7,773,528 B2* | 8/2010 | Ariyoshi et al. | | 370/241 |
| 7,936,695 B2* | 5/2011 | Oran | | 370/252 |
| 8,339,963 B2* | 12/2012 | Babiarz et al. | | 370/236 |
| 2002/0186685 A1* | 12/2002 | O'Brien et al. | | 370/352 |
| 2003/0110276 A1* | 6/2003 | Riddle | | 709/230 |
| 2005/0207399 A1* | 9/2005 | Spitzer | | 370/352 |
| 2008/0072307 A1* | 3/2008 | Maes | | 726/12 |
| 2008/0151764 A1 | 6/2008 | Wing et al. | | |
| 2008/0159168 A1* | 7/2008 | Ariyoshi et al. | | 370/253 |
| 2008/0175162 A1* | 7/2008 | Wing et al. | | 370/252 |
| 2008/0259800 A1* | 10/2008 | Clark et al. | | 370/235 |
| 2009/0097477 A1* | 4/2009 | Zhu | | 370/352 |
| 2010/0188989 A1* | 7/2010 | Wing et al. | | 370/252 |
| 2012/0084368 A1* | 4/2012 | Go et al. | | 709/206 |

OTHER PUBLICATIONS

Thompson et al., RFC 4170, "Tunneling Multiplexed Compressed RTP (TCRTP)," The Internet Society, Nov. 2005, (19 pages).
Rosenberg et al., RFC 5389, "Session Traversal Utilities for NAT (STUN)," Sep. 2008, (52 pages).

(Continued)

*Primary Examiner* — Lashonda Jacobs
(74) *Attorney, Agent, or Firm* — Edell, Shapiro & Finnan, LLC (57) ABSTRACT

In one embodiment a method and apparatus are provided that automatically establish an real time protocol (RTP) tunnel between an originator node or router and a terminator node or router, wherein the terminator node is close to a remote RTP peer. A method includes detecting a new flow of RTP packets wherein the RTP packets are encoded with a destination Internet Protocol (IP) address. Responsive to detecting the new flow, a probe is sent towards a same IP address as the destination IP address of the RTP packets. A response to the probe is received, the response including an identifier of a node that generated the response. Then, using the identifier, a tunnel is established with the node that generated the response, and thereafter compressed packets (compressed headers, compressed payloads, or both) are passed via the tunnel.

20 Claims, 7 Drawing Sheets

OTHER PUBLICATIONS

Koren et al., RFC 3545, "Enhanced Compressed RTP (CRTP) for Links with High Delay, Packet Loss and Reordering," The Internet Society, Jul. 2003, (23 pages).

Malkin, "Traceroute Using an IP Option," Xylogics Inc., Jan. 1993.

International Search Report and Written Opinion in counterpart International Application No. PCT/US2011/056277, mailed Dec. 23, 2011.

* cited by examiner

REAL TIME PROTOCOL PACKET TUNNELING

TECHNICAL FIELD

The present disclosure relates to communication via electronic data networks, and more particularly to communication that employs Enhanced Compressed Real Time Protocol (ECRTP).

BACKGROUND

Real Time Protocol or Real-time Transport Protocol (RTP, RFC3550) is an Internet-standard protocol for the transport of real-time data. It can be used for media-on-demand as well as interactive services such as Internet telephony. RTP is a "thin" protocol providing support for applications with real-time properties such as continuous media (e.g., audio and video), including timing reconstruction, loss detection, security and content identification.

Compressed RTP (CRTP), specified in RFC 2508, was developed to decrease the size of Internet Protocol (IP), User Datagram Protocol (UDP), and RTP packet headers that are employed to send RTP packets. However, CRTP was designed to work with reliable point-to-point links. In less-than optimal circumstances, where there may be long delays, packet loss, and out-of-sequence packets, CRTP does not function well for, e.g., Voice over IP (VoIP) applications. Thus, another adaptation, named Enhanced CRTP (ECRTP, RFC3545), was defined to overcome that problem. ECRTP, an extension to CRTP, is a header compression scheme for real time traffic, such as VoIP and other time sensitive services Like CRTP, ECRTP exploits the packet redundancy in a stream of IP/UDP/RTP packets, where virtually the same header is sent over and over again. The header and additional information is saved in a context at a compressor (transmit side) and decompressor (receive side). If the context is synchronized, the compressor can send only the differences between headers since the decompressor, using the last header, can reconstruct the full header. Tunneled CRTP (TCRTP) (RFC4170) describes how a tunnel can carry ECRTP payloads over an IP network, including multiplexing several ECRTP payloads into one IP packet Although ECRTP and TCRTP have overcome some of the issues associated with basic RTP and CRTP, there continues to be a desire for still further improvements in the implementation and use of TCRTP.

DESCRIPTION OF EXAMPLE EMBODIMENTS

Overview

In one embodiment a method and apparatus are provided that automatically establish a real time protocol tunnel between an originator node or router and a terminator node or router, wherein the terminator node is close to a remote real time protocol (RTP) peer. A method includes, at a tunnel originator node, detecting a flow of RTP packets wherein the RTP packets are encoded with a destination Internet Protocol (IP) address. Responsive to detecting the new flow, the method further provides for sending a probe towards a same IP address as the destination IP address of the RTP packets, and receiving a response to the probe, the response including an identifier of a node that generated the response. Then, using the identifier, a tunnel is established with the node that generated the response, and thereafter the RTP packets are passed, processed or sent via the RTP tunnel. RTP packet header and/or payload compression can be implemented over the established tunnel. That is, compressed RTP packets, corresponding to the flow of RTP packets, can then traverse the established tunnel.

In one implementation, the probe is in the form of a Session Traversal Utilities NAT (Network Address Translator) STUN message.

At a candidate tunnel terminator node, the method includes detecting the probe and an encoded HOP-COUNT. When the encoded HOP-COUNT is greater than 1, the method includes decrementing the HOP-COUNT and forwarding the probe towards its destination address. When, on the other hand, the HOP-COUNT equals 1, a response including an identifier of the candidate terminator node is generated, and as a result of the response, an RTP tunnel between the originator node from which the probe was sent and the candidate terminator node is established.

Example Embodiments

The Real-time Transport Protocol (RTP) defines a standardized packet format for delivering audio and video over the Internet. It was developed by the Audio-Video Transport Working Group of the Internet Engineering Task Force (IETF) and first published in 1996 as RFC 1889, superseded by RFC 3550 in 2003.

RTP is used extensively in communication and entertainment systems that involve streaming or interactive media, such as telephony, video teleconference applications and web-based push to talk features. RTP carries media streams controlled by, e.g., H.323 or Session Initiation Protocol (SIP) signaling protocols, among others, making RTP one of the technical foundations of the Voice over IP (VoIP) industry.

RTP is usually used in conjunction with the RTP Control Protocol (RTCP). While RTP carries the media streams (e.g., audio and video) or out-of-band events signaling (e.g., dual tone multiple frequency (DTMF) in separate payload type), RTCP is used to monitor transmission statistics and quality of service (QoS) information.

As noted previously, Compressed RTP (CRTP) was developed to decrease the size of the IP/UDP/RTP packet headers used in conjunction with RTP packets. However, CRTP was designed to work over point-to-point links. In less-than optimal circumstances, where there may be long delays, packet loss, and out-of-sequence packets, CRTP does not function well for, e.g., VoIP applications. Thus, ECRTP has more recently been fielded to address that problem. Like CRTP, ECRTP exploits the hop-by-hop redundancy in a stream of IP/UDP/RTP packets, where virtually the same header is sent over and over again. The header and additional information is saved in a context at a compressor (transmit side) and decompressor (receive side). If the context is synchronized, the compressor can send only the differences between headers since the decompressor, using the last header, can reconstruct the full header. In many implementations, the compressor and decompressor reside on respective RTP peer devices, e.g., IP telephone devices that enable VoIP. A still further enhancement to RTP contexts is to employ tunneling between nodes or routers servicing the RTP peers engaged in communication using RTP.

Figure 1:
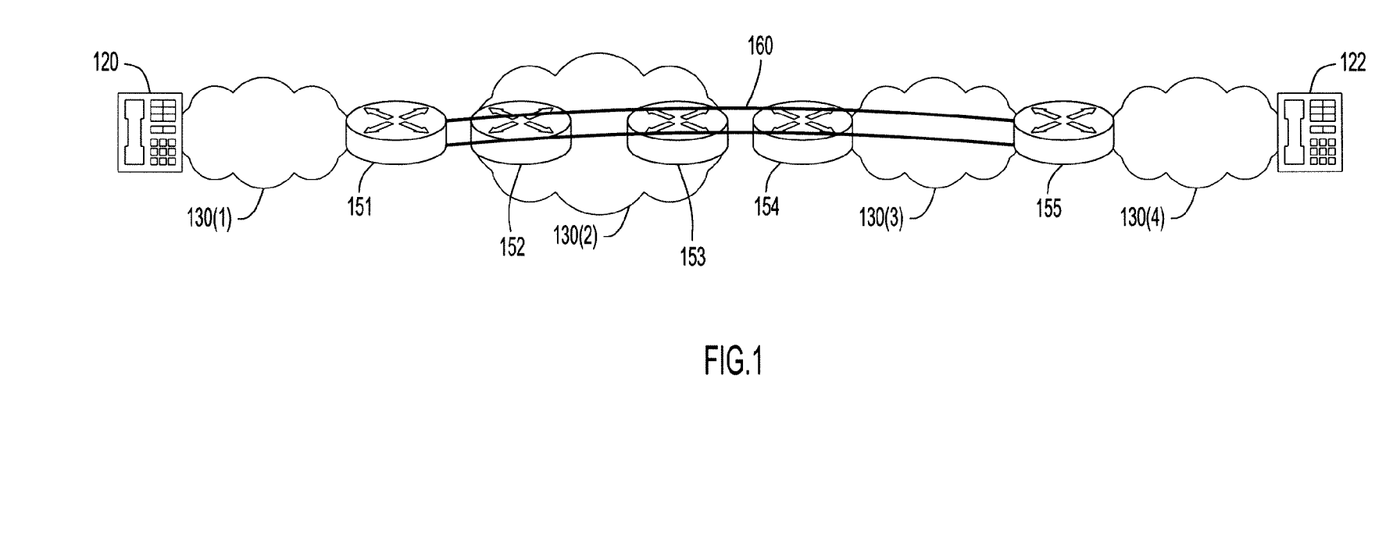
FIG. 1 shows a network including multiple routers, each of which can be configured to function as a candidate RTP tunnel terminator.

The following disclosure describes tunnel establishment for RTP flows primarily in the context of ECRTP. However, as will be explained, the established tunnel can be employed for header compression (e.g., ECRTP), payload compression, or both. FIG. 1 shows a network including multiple routers, each of which could be configured to function as a candidate ECRTP tunnel terminator. A "tunnel" as used herein is a communication connection resulting from any type of mechanism that enables encapsulation of a wide variety of network layer protocol packet types inside, e.g., IP tunnels, creating a virtual point-to-point link to routers at remote points over an Internet Protocol (IP) internetwork. One such mechanism is Generic Routing Encapsulation (GRE), which enables the establishment of a tunnel between two nodes, such as two routers. A tunnel is established between an "originator" node and a "terminator" node, as will be explained more fully below.

As shown in FIG. 1, an IP telephone 120 is in communication with another IP telephone 122 via an electronic data network 130 which, in the drawing, is shown in multiple segments 130(1), 130(2), 130(3), and 130(4). Routers 151-155 enable communication within given networks segments and between network segments, as shown. In the arrangement shown in FIG. 1, an ECRTP tunnel 160 (or, more simply, "tunnel") is established between routers 151 and 155. The tunnel optimizes the connection between these two end point nodes as data traverses the multiple segments of data network 130 and the multiple intervening routers. In this case, router 151 may be considered the originator node, and router 155 may be considered the terminator node.

The following discussion explains how a tunnel, in the context of ECRTP, is established between an originator node, such as router 151, which is near a first RTP peer (e.g., IP telephone 120) and a terminator node (router) nearest a second RTP peer, i.e., IP telephone 122.

In one embodiment, a router, such as router 151, maintains a list of IP addresses with which it has successfully established tunnels, and a list of IP addresses with which the router has tried—but failed—to establish tunnels. The first list represents a router's normal interface list, whereas the latter list may be referred to as a "blacklist." The blacklist may be limited in size and can be configured to age out after a period of time. The blacklist is an optimization tool that can be used to reduce wasting resources sending probes (explained below).

In the course of operation, a user might attempt to establish a voice connection between IP telephone 120 and IP telephone 122. Such a voice connection may be implemented using RTP, and RTP packets will thus begin to flow from IP telephone 120 towards IP telephone 122. While processing the RTP packets, router 151 determines if it is processing an RTP flow to a destination for which (a) it has not established a tunnel and (b) is not on its blacklist. Under such circumstances (namely, it may very well be possible to establish a tunnel with a remote node), the router attempts to establish a tunnel by sending a probe to an unknown router that is "close to" or "nearest" IP telephone 122. That is, the router that detects the new RTP flow does not know which downstream router might be an appropriate router to act as a tunnel terminator. Using a probe process, discussed next, the methodology attempts to locate an appropriate tunnel terminator.

Tunnel Originator Sending a Probe

In accordance with one implementation, to establish a tunnel with a remote or terminator node (e.g., a router), a probe, in, e.g., the form of a Session Traversal Utilities NAT (Network Address Translator) STUN message is sent employing the same 5-tuple (namely, Source IP address, Destination IP address, Source Port, Destination Port, and Protocol) and same DSCP bits as the RTP flow itself. "DSCP" stands for Differentiated Services Code Point, a 6-bit field in the header of IP packets for packet classification purposes. DSCP replaces the outdated IP precedence, a 3-bit field in the Type of Service byte of the IP header originally used to classify and prioritize types of traffic. The STUN protocol is defined by RFC5389.

A STUN message or probe configured in this fashion ensures the probe follows the same path as the RTP packets. The probe may (a) reach the RTP peer (i.e., the IP phone 122) or (b) may be seen by an on-path candidate tunnel termination router (e.g., any one of routers 152-155). If (a), the probe reaches the RTP peer, the RTP peer will (likely) silently discard the STUN packet (because it is not a valid RTP packet) or, if the RTP peer is running ICE (RFC 5245) the probe will fail validity checking and respond with a STUN error message. "ICE" is Interactive Connectivity Establishment (RFC5245), and makes use of the STUN protocol. ICE can be used by any protocol utilizing an offer/answer model, such as the Session Initiation Protocol (SIP).

In one implementation, the probe is a STUN Binding Request using, e.g., a randomly-generated 96-bit Transaction-ID, username=compression_probe, and a Message-Integrity computed using the password=compression_probe, and containing a unique STUN attribute from the Designated Expert range, such as ABCD-TC (for tunnel compression).

The ABCD-TC STUN attribute may contain the following fields:

In other possible embodiments, the reserved bits can be used to indicate the type of tunnel (e.g., GRE versus L2TP versus IP-in-IP).

In other possible embodiments, the "G" bit indicates a desire (by the originator) to perform payload compression. For example, this might be a lossless payload compression such as G.711.0 compression, LZS (ANSI X3.241-1994) or DEFLATE (RFC 1951), among others. The "H" bit indicates the headers are compressed (that is, it indicates ECRTP is desired). When establishing a tunnel, the G or H bit or both are set.

The first probe sent by router 151 is sent with HOP-COUNT=1, which is designed to elicit a response from a first candidate tunnel termination router that detects the probe. If a response to the probe is received by router 151, the HOP-COUNT is incremented and another probe is sent, in an effort to find a second (or subsequent) candidate tunnel terminator router.

In one possible implementation, for each HOP-COUNT value, the probe is transmitted three times, with the same contents (e.g., same Transaction-ID). Each retransmission may be sent, e.g., 60 ms apart. This retransmission may be employed to account for network packet loss, since if a packet were to be lost, a candidate tunnel terminator would never receive the probe, and thus never generate a response. Of course, those skilled in the art will appreciate that more or fewer retransmissions (or no retransmissions) may be implemented.

Candidate Tunnel Terminator Processing a Probe

If a candidate tunnel terminator sees or detects a STUN message with the username "compression_probe" and valid Message-Integrity, that candidate tunnel terminator processes the probe as follows. In all other cases (e.g., failure to validate the message), the candidate tunnel terminator simply forwards the packet normally.

If the message is a STUN Request, and the value of the HOP-COUNT is greater than 1, the candidate tunnel terminator decrements the HOP-COUNT, computes a new Message-Integrity, and forwards the packet normally towards the peer.

If, on the other hand, the HOP-COUNT is 1, a response to the STUN message is generated. The candidate tunnel terminator places its own IP address (and UDP port, if doing UDP tunneling) in the XOR-MAPPED-ADDRESS attribute of the STUN response and places the TTL (time to live) value from the IP header into the new SEEN-TTL field of the ABCD-TC attribute. If the STUN request indicated the originator wanted to do payload compression (G bit set) and the candidate tunnel terminator also desires to do payload compression, it would indicate its desire by setting the G bit in the response. The message is sent as a positive Binding Response back towards the originator node, by inverting the IP source and destination addresses, which will be received by router 151. In other words, the candidate tunnel terminator returns identifying information back to the originator node so that the originator node will know which node responded and, e.g., what type of compression may be desired.

Tunnel Originator Receiving Probe Response

When the tunnel originator receives a probe response, it validates the USERNAME, Transaction-ID, and Message-Integrity. If valid, the probe response is considered a candidate tunnel terminator.

The tunnel originator (i.e., router 151) may then send a second probe (or third, etc.) (with a new TRANSACTION-ID value each time), and increment the HOP-COUNT by 1 (each time), until the tunnel originator does not receive a response. That is, if router 154 in FIG. 1, generates a response to the STUN message probe, router 151 sends a second probe with HOP-COUNT=2. When seeing the second probe with HOP-COUNT=2, router 154 decrements the HOP-COUNT, computes a new Message-Integrity, and forwards the packet normally towards the RTP peer (i.e., IP phone 122). Router 155 then receives the probe with HOP-COUNT=1 and a response to the STUN message is, accordingly, generated. If the tunnel originator (router 151) increments the HOP-COUNT to three for a third probe, that probe would ultimately be passed on to IP telephone 122, which would simply drop or ignore the probe, as it is not a properly configured RTP packet. When router 151 no longer receives responses from the probes it sends, the tunnel originator assumes it has found the tunnel terminator closest to the remote RTP endpoint, here router 155, as shown in FIG. 1.

If the SEEN-TTL (time to live) field is one less than the TTL used to send the probe, the originating tunnel device can deduce that there are no router hops between itself and the responding candidate tunnel terminator. That is, both the originator and the terminator are on a link (e.g., 3G link, satellite link, etc.). Thus, router 151 can send all traffic via the tunnel, without verifying the candidate tunnel terminator is on-path—because it will always be on path. Of course, the tunnel originator may still wish to use a higher HOP-COUNT in order to try to find a candidate tunnel terminator closer to the remote peer.

Figure 2:
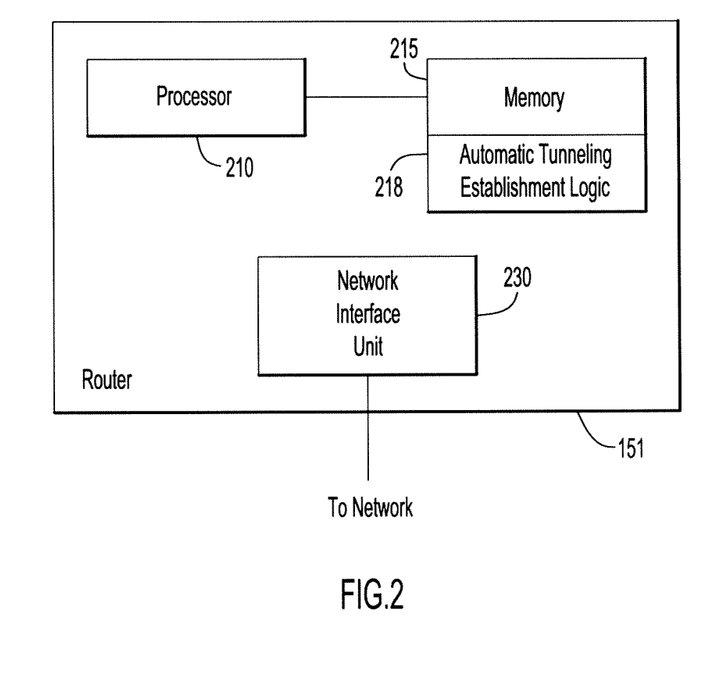
FIG. 2 shows an example embodiment of a router including automatic tunneling establishment logic.

FIG. 2 shows an example embodiment of a router (e.g., router 151, or 155, or any router in the network) including automatic tunneling establishment logic 218 that may implement the functionality described above.

More specifically, router 151 may be implemented using one or more hardware components, one or more software components, or combinations thereof. In one embodiment, router 151 includes a processor 210, memory 215, which may also include automatic tunneling establishment logic 218, and a network interface unit 230.

Processor 210 may be a programmable processor (microprocessor or microcontroller) or a fixed-logic processor. In the case of a programmable processor, associated memory 215 may be of any type of tangible processor readable memory (e.g., random access, read-only, etc.) that is encoded with or stores instructions to effect the functionality of router 151, and particularly the automatic tunneling establishment methodology described herein.

In the case of a fixed-logic processing device, the logic or instructions may be encoded in, e.g., an application specific integrated circuit (ASIC) or digital signal processor that is configured with firmware comprised of instructions or logic that cause the processor 210 to perform the functions described herein.

Thus, router 151 may take on any of a variety of forms, so as to be encoded, such as with fixed logic or programmable logic (e.g., software/computer instructions executed by a processor), and any processor may be a programmable processor, programmable digital logic (e.g., field programmable gate array) or an ASIC that comprises fixed digital logic, or a combination thereof. In general, any process logic may be embodied in a processor (or computer) readable medium that is encoded with instructions for execution by a processor that, when executed by the processor, are operable to cause the processor to perform the functions described herein, e.g., generate a probe upon detection of a new RTP flow, and respond to such a probe in accordance with automatic tunnel establishing logic 218.

Figure 3:
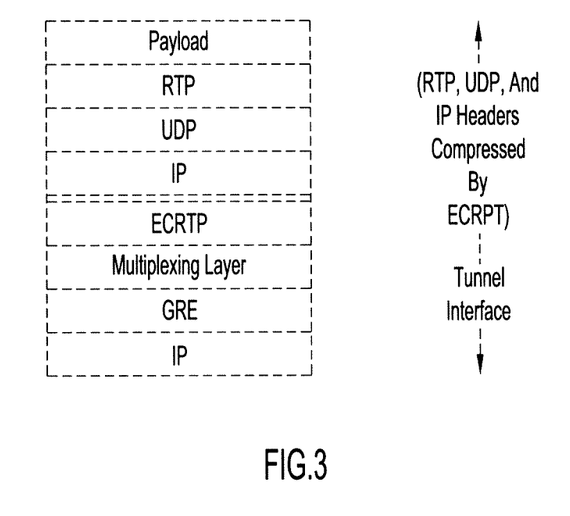
FIG. 3 shows an encapsulation construct over which a multiplexing layer can be run.

FIG. 3 shows an encapsulation construct over which a multiplexing layer can be run. The tunnel itself may be a GRE tunnel, as mentioned. More specifically, the top portion of FIG. 3 shows an RTP payload and its IP/UDP/RTP header. As shown, this construct is subjected to header compression using ECRTP. As described in TCRTP (RFC5170), multiple such constructs can be sent via the multiplexing layer, where the underlying data is sent via the tunnel (implemented with IP) that is established in accordance with the probe approach described herein. Thus, multiple RTP payloads can be transmitted over a single established ECRTP tunnel.

Figure 4:
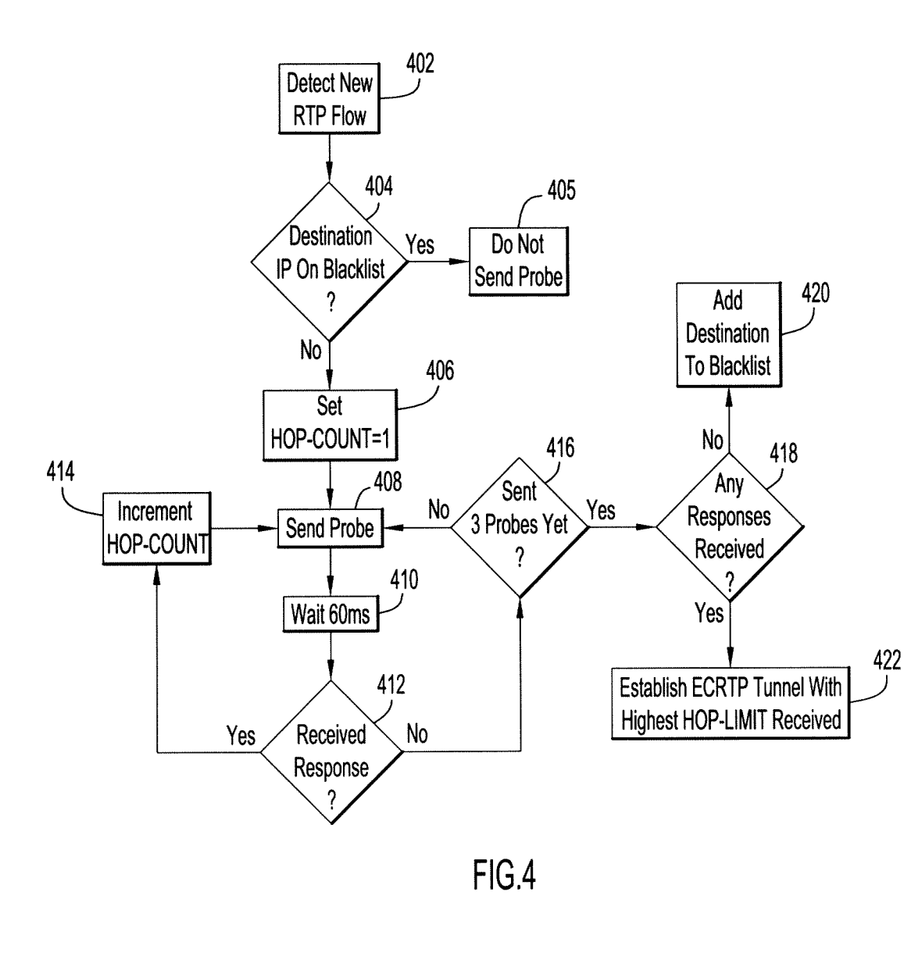
FIGS. 4 and 5 show example processes for performing automatic tunneling establishment in the context of RTP.
Figure 5:
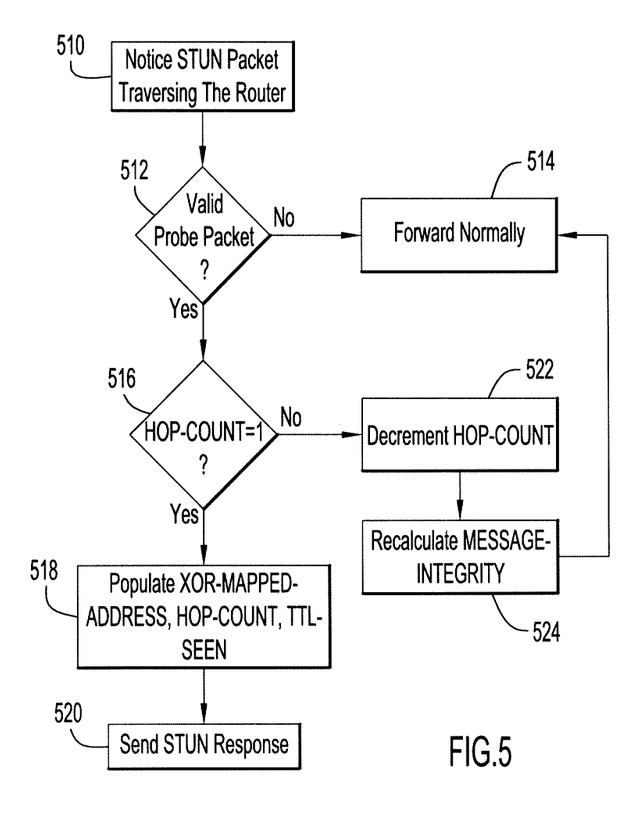

FIGS. 4 and 5 show example processes for performing automatic tunnel establishment.

Reference is first made to FIG. 4, which shows a process that might be performed at a tunnel originator node, such as router 151. At step 402 a new RTP flow is detected. At step 404 the destination IP address of the flow is detected, and it is determined whether that destination IP address is on a blacklist (which lists IP address with which a tunnel could not be established, and as a result there would be no reason to make yet another attempt at establishing a tunnel). If the destination IP address is on the blacklist then, as indicated at step 405, no probe is sent.

On the other hand, if the destination IP address is not on the blacklist, then a probe (such as a STUN message) is generated and an initial HOP-COUNT thereof is set to 1 at step 406. The probe is then sent at step 408. In accordance with one embodiment, the tunnel originator waits 60 ms (step 410) before checking, at step 412, whether a response has been received. Assuming a response to the probe is received then, at step 414, the HOP-COUNT of a new probe is incremented in an attempt to reach a candidate tunnel terminator beyond the candidate tunnel terminator that sent the most recent response. The new probe is then again sent at step 408.

If no response to, e.g., the second (or subsequent) probe is received at step 412, then it is determined, at step 416, whether a sufficient number of probes, e.g., three, have been sent. That is, packet loss might have caused a probe never to have arrived at a candidate tunnel terminator, or its response to be lost. Accordingly, it may be prudent to make multiple attempts at sending probes before deciding that no response is to be expected. Thus, if, at step 416, the number of probes to be sent has not been reached, then the process flow returns to step 408 where the same probe is sent again.

If, at step 416, all of the probes to be sent have been sent, then it is determined, at step 418, whether any responses to the probes have been received. If no responses have been received, then that means that no tunnel could be established with a node along a path to the destination IP address. Consequently, that destination IP address may be added to the blacklist at step 420. Entries in the blacklist may be removed from the blacklist after a predetermined period of time (e.g., hours, days, etc.).

If, at step 418, a response to one or more probes has been received, then, at step 422, an, e.g., ECRTP tunnel is established with the candidate tunnel terminator that responded to a probe with the highest HOP-COUNT, or HOP-LIMIT as indicated in FIG. 4. The candidate tunnel terminator associated with highest HOP-COUNT is likely the closest (or at least one of the closest) possible tunnel terminator to the RTP remote peer.

Reference is now made to FIG. 5, which depicts a process that may be performed by a candidate terminator node or router that receives a probe (such as a STUN message) sent by a tunnel originator. At step 510, the router detects or notices a probe traversing the router. At step 512, it is determined whether what has been detected is a valid probe packet. If not, then the packet is forwarded normally, as indicated by step 514.

If a valid probe packet has been detected at step 512, then it is determined whether the HOP-COUNT is equal to 1. If yes, this means that the router should generate a response to the probe. Response generation is performed at steps 518 and 520 wherein XOR-MAPPED ADDRESS, HOP-COUNT, and TTL SEEN fields are populated and the STUN probe response is sent.

If, at step 516, the HOP-COUNT is not equal to 1, i.e., the HOP-COUNT is greater than 1, then the HOP-COUNT is decremented at step 522, the Message-Integrity is recalculated, and the probe is forwarded normally at step 514, so that a potentially closer router (to the remote RTP peer) will respond.

Although the probe being sent to identify the possibly closest candidate tunnel terminator has been described as a STUN message, other types of probes can also be employed. A characteristic of a probe for purposes of RTP tunnel establishment is that the probe takes the same path as the RTP packets themselves, to ensure the probe traverses or "hits" a tunnel termination device that is naturally on the same routing path.

The use of STUN messages for probes may be desirable because STUN packets fail the RTP validity check and, consequently, are discarded by RTP receivers (e.g., IP telephone 122). Moreover, STUN works with uni-directional RTP.

Other possible probe types include RTP Header Extension and encoding bits in the IP TTL.

RTP Header Extension is described in Section 5.3.1 of RFC 3550 and allows additional information to be added to an RTP header. HOP-COUNT values could be, for example, added to the RTP header. A response mechanism could then be initiated based on the detected HOP-COUNT value.

To use IP TTL, the probe can be encoded into the uppermost bits of the IP TTL field of normally-flowing RTP traffic. As most hops are less than approximately 30, several bits of the IP TTL field may be available and can be used for communication between the two candidate tunnel endpoints. Of course, this type of arrangement relies on bi-directional RTP traffic which, while common for voice phone calls, may not be employed for announcements or interactive voice response (IVR) systems.

The probe message can also encode the tunnel originator's IP address. This allows the probe response to be sent directly to the tunnel originator's IP address (rather than on the reverse path) which provides better support of asymmetric routing. This also allows the tunnel terminator to initiate tunnel establishment with the tunnel originator. However, either of these approaches may create additional security exposure.

Figure 6:
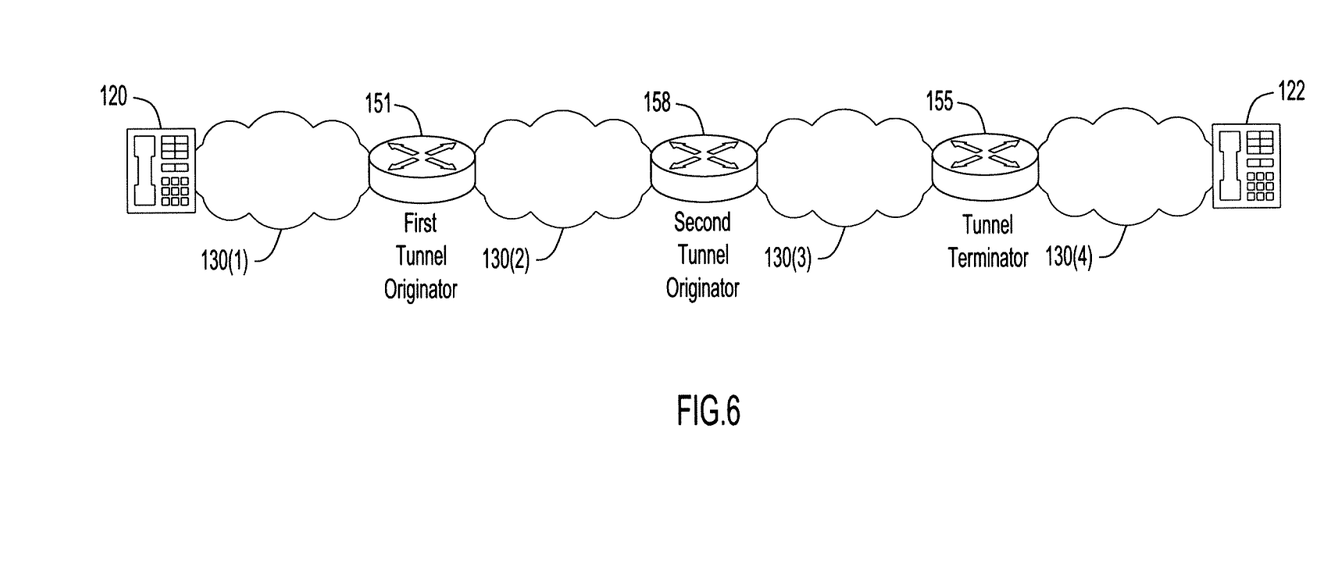
FIG. 6 shows a network including multiple routers, several of which might function as an RTP tunnel originator.

FIG. 6 shows a network including multiple routers, wherein several of the routers might want to act, simultaneously, as tunnel originators. More specifically, it is possible for multiple routers, e.g., routers 151 and 158 in FIG. 6, to each believe it is the first tunnel originator seeing a new RTP flow. As a result, each would generate and send its own probes. In most cases, the second tunnel originator 158 will notice the STUN probes from the first tunnel originator 151 and immediately cease being a tunnel originator for the flow. However, due to packet loss it is possible that the second tunnel originator 158 will not see the STUN probe. However, neither situation is particularly harmful since once the first tunnel originator 151 (the one closest to the RTP sender—IP telephone 120) successfully sets up its tunnel to the tunnel terminator 155, the second tunnel originator 158 will no longer see the RTP packets. A possible worse case is that an additional tunnel is established between the second tunnel originator 158 and the tunnel terminator 155, but such a tunnel will likely timeout due to inactivity.

Figure 7:
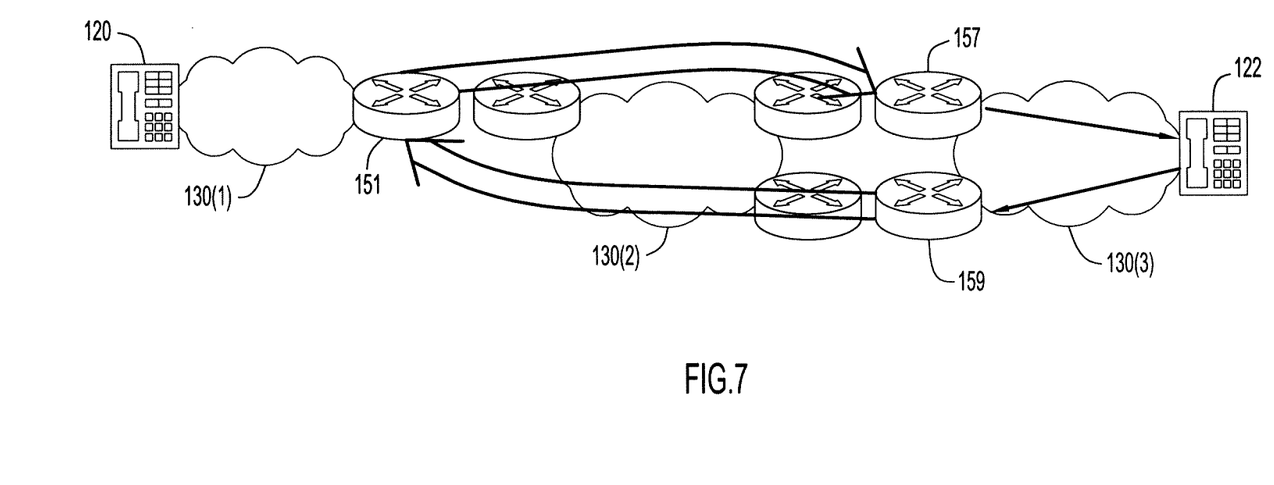
FIG. 7 shows an embodiment in which asymmetrical routing may be supported between an RTP tunnel originator and a remote RTP peer using ECRTP tunneling.

The mechanism described herein also allows asymmetric routing between a tunnel originator and a remote RTP peer. Thus, as shown in FIG. 7, tunnel originator router 151 may establish two different tunnels 702, 704 with different routers 157, 159. Thus, even though the tunnel originator and terminator routers are not the same for both directions of the RTP flow, the tunnel mechanism nevertheless functions in the same way.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
   detecting a flow of real time protocol (RTP) packets at a router, the RTP packets being encoded with a destination Internet Protocol (IP) address;
   responsive to detecting the flow of RTP packets, sending a probe towards a same IP address as the destination IP address of the RTP packets;
   receiving a response to the probe, the response including an identifier of a node that generated the response;
   using the identifier, establishing a tunnel with the node that generated the response; and
   thereafter passing compressed RTP packets, corresponding to the flow of RTP packets, via the tunnel.

2. The method of claim 1, further comprising compressing the RTP packets by compressing headers thereof.

3. The method of claim 1, further comprising compressing the RTP packets by compressing respective payloads thereof.

4. The method of claim 1, wherein the probe comprises a Session Traversal Utilities NAT (Network Address Translator) STUN message.

5. The method of claim 1, further comprising encoding the probe with a same Source IP address, Destination IP address, Source Port, Destination Port, and Protocol as the RTP packets.

6. The method of claim 1, further comprising, setting an initial HOP-COUNT in the probe to one.

7. The method of claim 6, further comprising incrementing the HOP-COUNT of a new probe each time a response to a most recently sent probe is received.

8. The method of claim 1, further comprising sending the probe a predetermined number of times.

9. The method of claim 1, further comprising maintaining a list of IP addresses with which a tunnel could not be established.

10. The method of claim 1, further comprising sending successive probes, wherein each successive probe is encoded with an incremented HOP-COUNT in response to a respective response to a prior successive probe.

11. The method of claim 10, further comprising establishing the tunnel with a node that responded to a successive probe having a highest HOP-COUNT.

12. A method comprising:
    detecting, at a router, a probe having a HOP-COUNT;
    when the HOP-COUNT is greater than 1, decrementing the HOP-COUNT and forwarding the probe towards its destination address;
    when the HOP-COUNT equals 1, generating a response including an identifier of the router; and
    as a result of the response, establishing a tunnel for carrying a real time protocol data flow between an originator node from which the probe was sent and the router.

13. The method of claim 12, wherein the probe comprises a Session Traversal Utilities NAT (Network Address Translator) STUN message.

14. The method of claim 12, further comprising sending compressed real time protocol packets via the tunnel.

15. The method of claim 12, further comprising receiving compressed packets destined for a real time protocol peer via the tunnel, and receiving uncompressed packets from the RTP peer.

16. Logic encoded on one or more tangible media for execution and when executed operable to:
    detect a flow of real time protocol (RTP) packets, the RTP packets being encoded with a destination Internet Protocol (IP) address;
    send, responsive to the flow, a probe towards a same IP address as the destination IP address of the RTP packets;
    receive a response to the probe, the response including an identifier of a node that generated the response;
    establish, using the identifier, a tunnel with the node that generated the response; and
    thereafter pass compressed RTP packets via the tunnel.

17. The logic of claim 16, when executed, further operable to:
    generate, as the probe, a Session Traversal Utilities NAT (Network Address Translator) STUN message.

18. The logic of claim 16, when executed, further operable to:
    encode the probe with a same Source IP address, Destination IP address, Source Port, Destination Port, and Protocol as the RTP packets.

19. An apparatus, comprising:
    a processor;
    memory in communication with the processor; and
    a network interface unit configured to pass compressed real time protocol (RTP) packets to and from a network;
    the processor configured to:
        detect a flow of RTP packets, the RTP packets being encoded with a destination Internet Protocol (IP) address;
        send, responsive to the flow, a probe towards a same IP address as the destination IP address of the RTP packets;
        receive a response to the probe, the response including an identifier of a node that generated the response;
        establish, using the identifier, a tunnel with the node that generated the response; and
        thereafter pass, via the network interface unit, compressed RTP packets, corresponding to the flow of RTP packets, via the tunnel.

20. The apparatus of claim 19, wherein the processor is further configured to:
    generate, as the probe, a Session Traversal Utilities NAT (Network Address Translator) STUN message.

* * * * *